March 8, 1932. F. A. NICHOLSON ET AL 1,848,794
TRIMMER SAW
Filed May 26, 1931 4 Sheets-Sheet 1

INVENTORS
Fred A. Nicholson
Wilmot T. Pritchard
BY
ATTORNEY

March 8, 1932.      F. A. NICHOLSON ET AL      1,848,794
TRIMMER SAW
Filed May 26, 1931      4 Sheets-Sheet 4

INVENTORS
Fred A. Nicholson
Wilmot T. Pritchard
BY
ATTORNEY

Patented Mar. 8, 1932

1,848,794

UNITED STATES PATENT OFFICE

FRED A. NICHOLSON AND WILMOT T. PRITCHARD, OF SEATTLE, WASHINGTON, ASSIGNORS TO STETSON-ROSS MACHINE COMPANY, OF SEATTLE, WASHINGTON, A CORPORATION OF WASHINGTON

TRIMMER SAW

Application filed May 26, 1931. Serial No. 540,038.

Our invention relates to an automatic trimmer saw. More particularly our invention relates to an automatic trimmer saw in which a rotating circular saw is mounted on an oscillating frame, where power is applied to oscillate the frame in both directions.

One of the principal objects of our invention is to provide a mechanism whereby the power of a rotating driving means may be applied to drive the swinging saw frame in one direction as the saw trims the desired object and drives the swinging saw frame back to a starting position after a cut has been made.

Another object of our invention is to provide a selective means, which may be easily operated, applying the power to oscillate this frame.

Another object of our invention is to provide means which will permit the operator to selectively obtain the desired length of the full stroke of the swinging saw frame and to provide means whereby the swinging saw frame may be returned to the initial position from any desired intermediate position in the stroke.

Our machine may be used for many different kinds of work, which uses will be apparent to those skilled in the art as trimmer saws generally are old in the art. However, trimmer saws, as heretofore made, do not include means whereby the power of a rotating driving means may be applied to oscillate the swinging frame. From the new feature in our machine, as respects the devices heretofore in common use, the capacity of the saw is greatly increased, less effort is required of the operator in the operation thereof, and a more perfect and more accurate saw cut is obtained.

Heretofore trimmer saws of this nature have necessitated manual operation of the swinging saw frame, either in one or both directions, thus consuming time and requiring considerable physical effort on the part of the operator who must also feed the saw. This effort leaves the operator only a small portion of his time to devote to feeding the saw and consequently the output of the saw is greatly diminished.

In accordance with our invention the effort required of the operator to control the swinging movement of the power operated saw frame is relatively slight, thereby permitting him to devote the greater portion of his time to feeding the saw, which speeds up the operation of the same so that one hundred or less cuts per minute are readily obtainable.

In our power means to oscillate the swinging saw frame, without vibration or shock, uniformly in one direction as the saw cut is being made and to uniformly return the swinging frame to its initial starting position after the saw cut has been made, another important object of our invention is obtained. This makes it possible to cut off lumber, trim out the defects in lumber and to manufacture finished lumber in predetermined lengths with a uniform, smooth and even surface upon the trimmed ends.

The above mentioned general objects of our invention, together with others inherent in the same, are attained by the mechanism, illustrated in the following drawings, the same being preferred exemplary forms of embodiment of our invention, throughout which drawings like reference numerals indicate like parts:

9 indicates an electric motor, having a source of power not shown. 10 indicates a driving belt and 11 a driven wheel to revolve the rotating driving means 12. It is obviously immaterial to our invention the source of power or the means of transmission of power to rotating driving means 12 and we have herein attempted only to set forth one of the well known methods.

Figure 4:
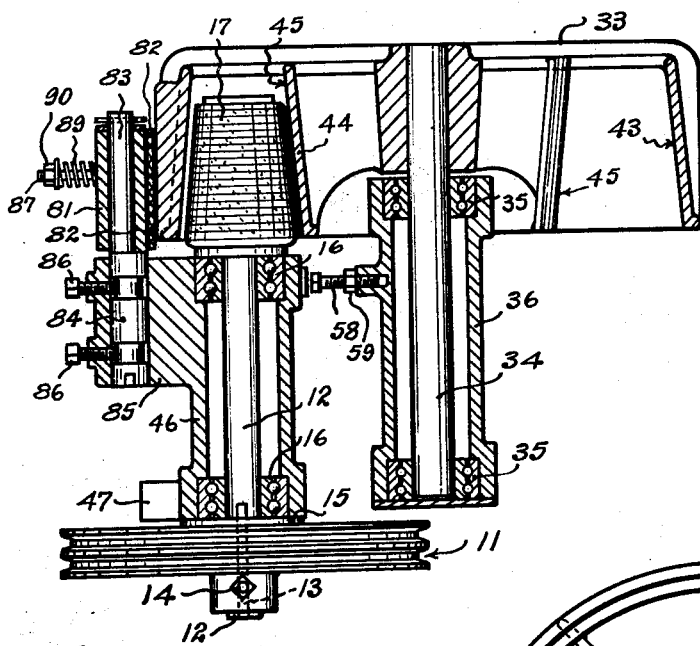
Fig. 4 is a detached sectional view of the driving mechanism for oscillating the frame taken substantially on broken line 4—4 of Fig. 3.
Figure 5:
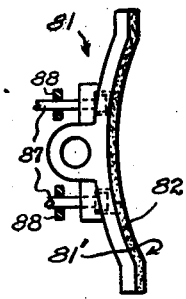
Fig. 5 is a detached view in elevation of the brake member.

Referring especially to Fig. 4, driven wheel 11 is secured to shaft 12 preferably by key 13 and set screw 14. Plate 15 preferably is used to position the driven wheel 11 as the shaft 12 rotates. Suitable bearings 16, the type herein shown being ball bearings, are employed to prevent friction as the shaft rotates. Secured to the end of shaft 12 is friction wheel 17; obviously other types and shapes of friction wheels may be employed but we prefer to use this type and shape as it has been thoroughly tried in many other fields as a friction engaging means and has been found practical. Also, the tapered shape permits adjustment for wear, which adjustment will be discussed later.

Referring to Figs. 1, 2 and 3, 18 indicates a circular saw, 19 a guard means, 20 an electrical motor having direct driving connection with the saw 18. It is to be understood that the size and type of saw, motor and guard will vary with the work to be done. 21 indicates generally a swinging saw frame, preferably of goose neck shape which serves as a support and mounting for the saw and motor just described. The swinging saw frame 21 comprises two divergent leg members 22 which unite at their upper ends to form a neck portion 23. The lower ends of the leg members 22 are rigidly connected by a transverse sleeve 24, which is non-rotatably mounted on a shaft 25. The shaft 25 has eccentric bearing members 26 which extend outwardly from both ends of the sleeve 24 and are journaled in the bearings 27 on a base frame 28. The base frame 28 also serves as a means on which the motor 9 and driving parts hereinbefore described are mounted. The frame 21 is strong and rigid in proportion to its weight and the goose-neck shape and design of this frame permits it to be readily operated across and back over a work supporting table 29 indicated by dot and dash lines in Figs. 2 and 3, said table being preferably slotted as at 30 for the reception therein of saw 18. The eccentricity of the bearing members 26 on the shaft 25 affords a means for raising and lowering the goose-neck frame an amount sufficient to provide all necessary vertical adjustment of the saw 18. This adjustment is made by loosening the set screws 31 which clamp the sleeve 24 to the shaft 25 then turning said shaft 25 the required amount and tightening said set screws 31. The shaft 25 may be turned by insertion of a suitable instrument into holes 32 in the end portions thereof. This adjustment is necessary to compensate for wearing down of the saw 18 and for changes in saws.

Figure 8:
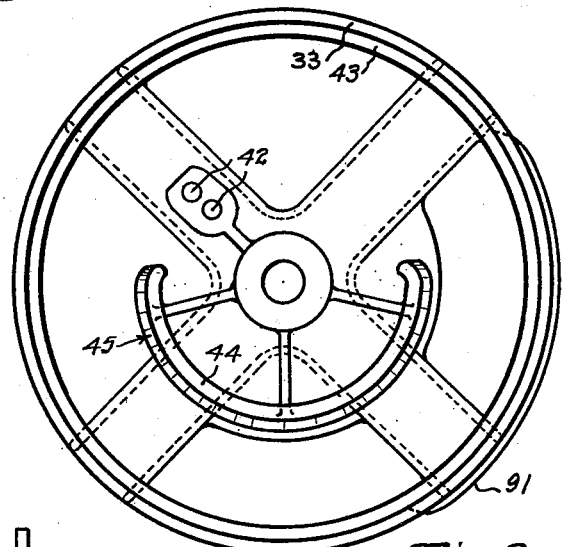
Fig. 8 is a detached side elevation of the friction driven wheel.

The means for moving the swinging saw frame back and forth, more clearly shown in Fig. 4, embodies a cup shaped friction wheel 33 secured on a shaft 34 which is journaled in bearings 35 in a bearing bracket 36 which is secured to the base frame 28. A connecting rod 37 has one end pivotally connected with a crank pin 38 on the friction wheel 33 and the other end adjustably connected as by nuts 39 with a cross head 40 which extends crosswise of the forked portion 22 of the goose neck frame and is pivoted in suitable lugs 41 on said goose neck frame. Two or more pairs of the lugs 41 are preferably provided whereby the angle through which the goose neck frame 21 is oscillated, and the consequent length of stroke of the saw 18, may be adjusted by changing connection of the cross head from one set of lugs 41 to another. The position of the goose neck frame 21 and consequent position of stroke of the saw may be adjusted by adjustment of the nuts 39. The crank pin 38 is also adjustably secured to the friction wheel as by provision of a plurality of holes 42, see Fig. 8, whereby a further means is provided for adjusting the length of stroke of the swinging saw frame.

The friction wheel 33 has a frustro-conically shaped internal bearing surface 43 and the conical friction roller 17 is disposed within said friction wheel 33 and operatively positioned in close proximity to the surface 43 whereby it may engage with the surface 43 to drive the friction wheel in one direction.

For the purpose of driving the friction wheel 33 in a reverse direction at accelerated speed we provide, within said friction wheel, a circular segment 44 having an inclined friction surface 45, movable in a circular path in close proximity to the inner peripheral surface of the friction roller 17. Thus said friction roller is moved and disengages the surface 43 and engages the surface 45 of the segment 44 and the friction wheel is thereby rotated in a reversed direction.

Figure 1:
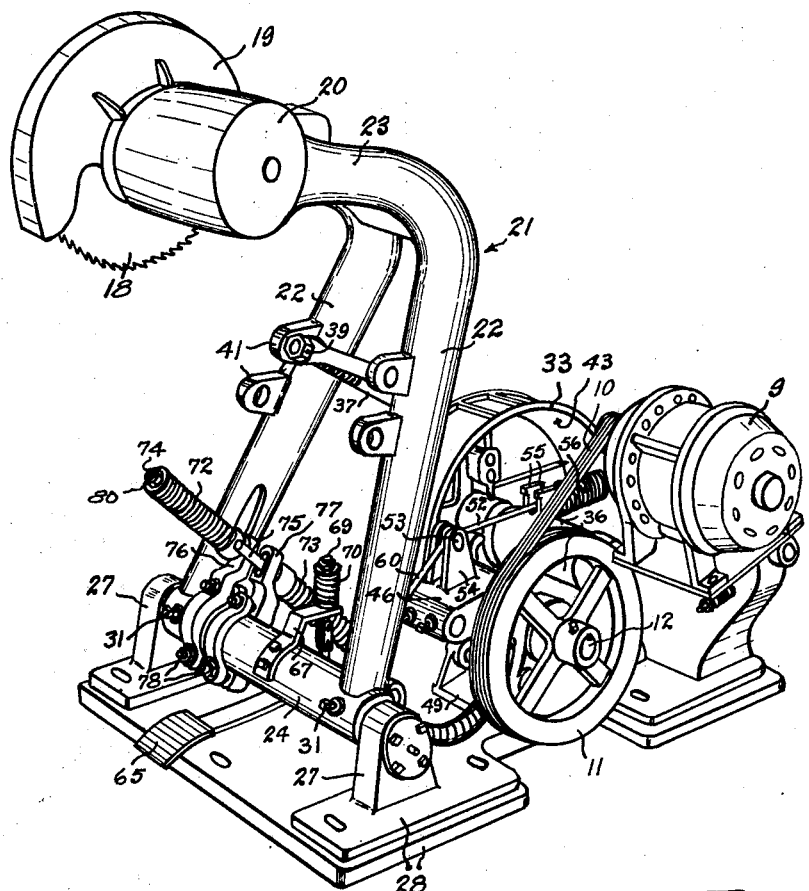
Figure 1 is a perspective view of our device.
Figure 2:
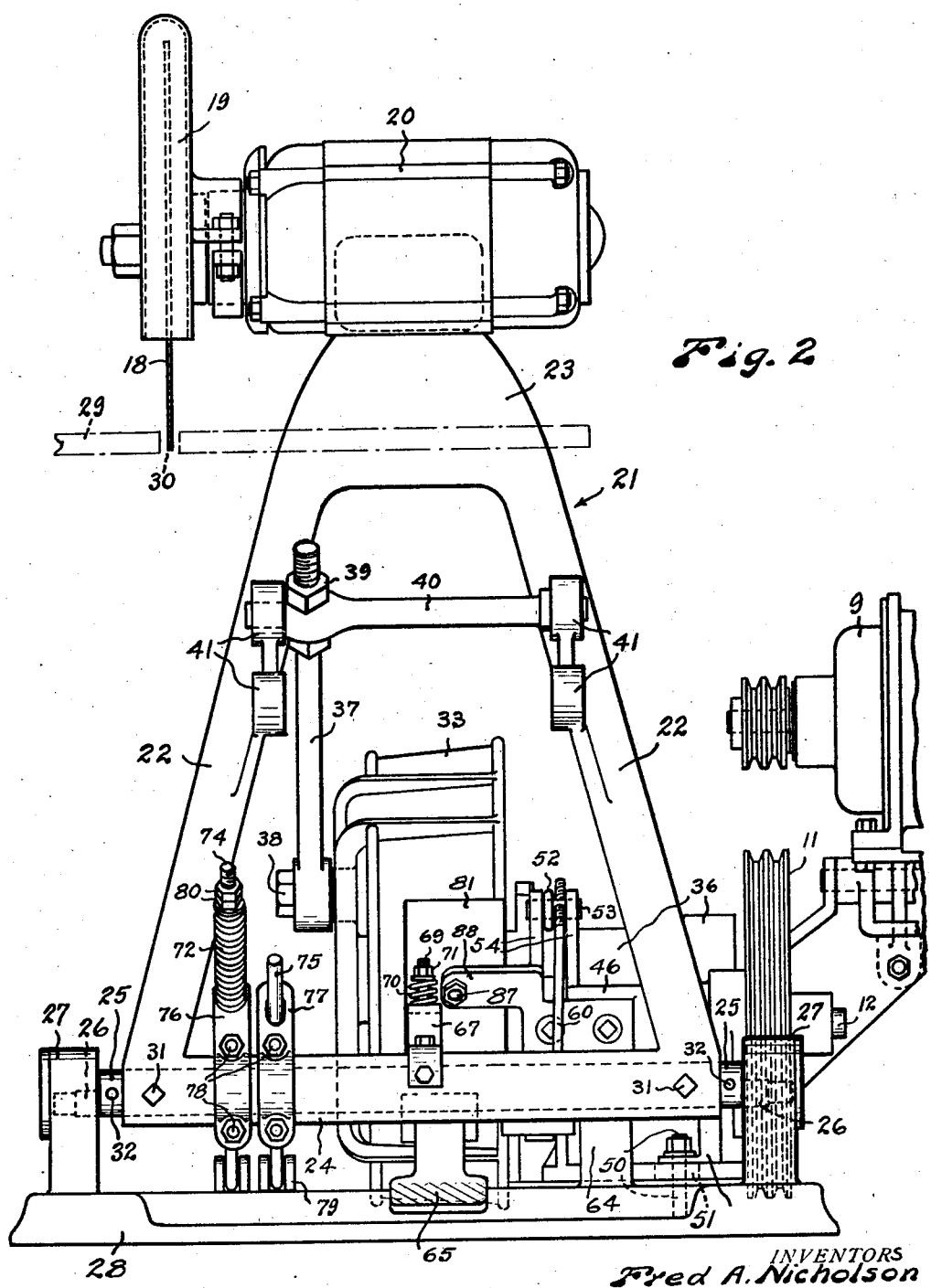
Fig. 2 is a front elevation with parts of the driving motor and its assembly cut away and the driving belt removed.
Figure 3:
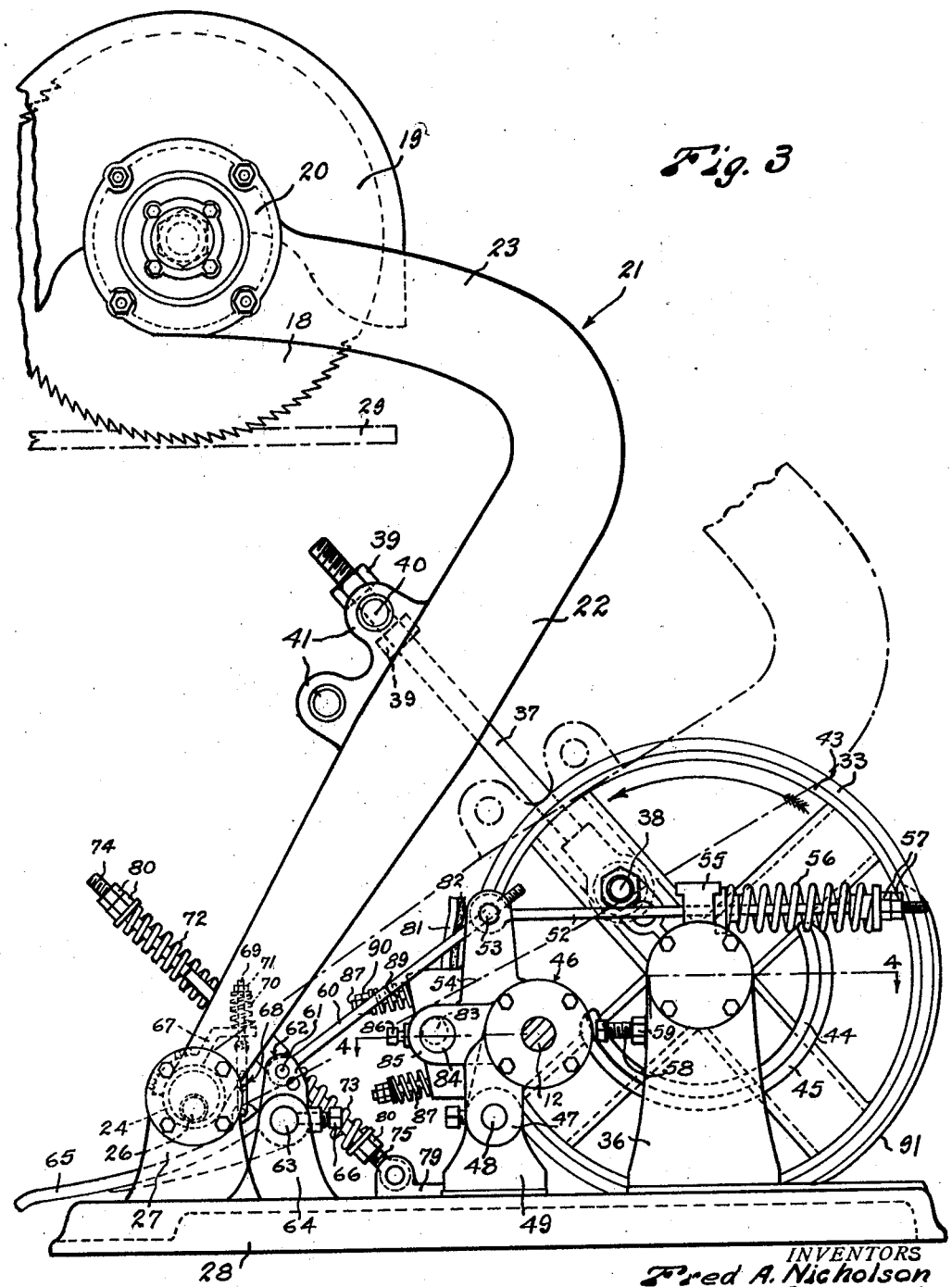
Fig. 3 is a side elevation with the motor, the belt, and the driving wheel removed to permit a view of the inner mechanisms.
Figure 6:
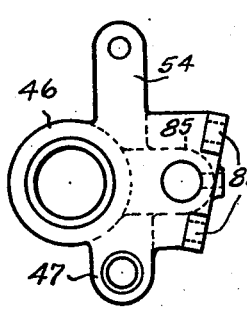
Fig. 6 is a detached view in side elevation of the brake and driving member mounting means.
Figure 7:
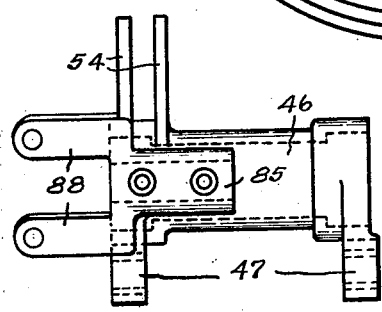
Fig. 7 is front elevation of Fig. 6.

The shaft 12 on which the friction roller 17 is mounted is supported in a bearing bracket 46, said bracket 46 having downwardly extending lugs 47, Figs. 3, 6 and 7, which are connected by pivot means 48 with base brackets 49. The base brackets 49 are adjustably mounted on the base 28 by means of bolts 50 disposed in slots 51 and afford means for adjusting the position of the friction roller 17 relative to the friction wheel 33. Obviously the friction roller 17 may be adjusted relative to friction wheel 33 by other means which does not require movement of the shaft supporting brackets 46 and 49. The belt pulley 11 may be adjusted longitudinally on the shaft 12, by means of key 13 and set screw 14, to preserve alignment with the driving pulley of the motor 9, in case the alignment thereof is disturbed by adjustment of friction roller 17.

The bearing bracket 46 is mounted for rocking movement on the pivot 48 and means are provided for holding and stopping and moving this bearing bracket to permit the operator to selectively engage or disengage the friction roller 17 relative to the surfaces 43 and 45 of the friction wheel 33. This means includes a link 52 connected by pivot means 53 with the top end of upwardly extending lugs 54 which are provided on the bearing bracket 46. The link 52 extends rearwardly through relatively fixed lugs 55 on the bearing bracket 36 and has a compression spring 56 thereon, said spring 56 being interposed between the lugs 55 and adjustable lock nuts 57 on the link 52 whereby it will tend to urge the bracket 46 to the right, or toward the axis of the friction wheel 33, or in a clockwise direction, as shown in Fig. 3. A stop in the nature of a screw 58 with lock nut 59 thereon, is provided for engagement by the bracket 46 to limit the swinging movement of said bracket 46 toward the axis of the friction wheel 33. This stop 58 prevents the friction roller 17 from being moved far enough toward the axis of the friction wheel 33 so that it will be struck and damaged by the end of the segment 44. When the friction roller 17 rests on the surface 45 of the segment 44, as it does in the position shown in Fig. 4, then the bracket member 46 will be held just clear of the stop screw 58. For rocking the bracket member 46 in the other direction to bring the friction roller 17 into contact with the annular surface 43 of the friction wheel 33 we provide a link 60 which is connected with the pivot member 53 and thence extends forwardly and downwardly and is connected by pivot 61 with the upper end of lever arm 62 which is rigidly secured to a rock shaft 63. The rock shaft 63 is mounted in a frame bracket 64 and has a foot pedal 65 fixedly secured thereto as by a set screw 66. When the foot pedal 65 is depressed a pull is exerted through the link 60 on the elements 54 of bearing bracket 46 and the friction roller 17 is moved into engagement with the circular bearing surface 43 of friction wheel 33. As long as the foot pedal 65 is held down the friction wheel 33 will be continuously rotated and the saw 18 will be moved back and forth throughout its complete stroke. If the foot pedal 65 is released before the saw has completed its full forward stroke the friction roller 17 will be instantly drawn by the spring 56 against the segment 44, the direction of rotation of the friction wheel 33 will be reversed and the swinging frame member 21 will be returned to the starting position at an accelerated speed. This makes it possible for the operator to speed up the operation of the saw, while trimming narrow lumber by making short forward strokes and accelerated return strokes and thereby not permitting the swinging saw frame to complete its full stroke.

As an aid to making the shortened saw frame strokes, we have provided an elastic connection between the foot pedal 65 and the swinging saw frame so that a gradually increasing upward pressure will be exerted on the pedal 65 as the saw frame swings forwardly on its stroke. This tends to raise the pedal and indicate upon the foot of the operator the position of the swinging saw frame. By such direct indication to the foot of the operator, together with the upward urge of the pedal, it is found that an inexperienced operator may judge the time to remove the pressure of his foot to obtain short strokes, although the complete stroke is made during a period which is only a portion of one second. This mechanism comprises a bracket 67 secured to the sleeve 24 and preferably connected with the foot pedal 65 by a chain 68, link 69 and compression spring 70, adjustable by means of a nut 71. If the machine is being used for trimming lumber of uniform width, obviously this spring 70 may be adjusted, to secure any desire impulse or the foot pedal 65 or may be totally disconnected if desired.

To further increase the smoothness of operation, we preferably provide cushioning means in the form of compression springs 72 and 73 which are operatively disposed on rods 74 and 75 respectively and engage with lever arms 76 and 77 respectively on the sleeve member 24 of the swinging frame member 21. Lever arms 76 and 77 are preferably in form of clamps which are adjustably clamped as by bolts 78 to the sleeve member 24, thus making said lever arms independently adjustable. The rods 74 and 75 are pivotally connected at their bottom ends with rigid brackets 79 on the base frame 28. The springs 72 and 73 are adjustably supported as by nuts 80. The springs 72 serve as a cushion on the forward stroke of the swinging frame and the spring 73 cushions the return of the same. Obviously, these two springs may be arranged to operate upon a single lever arm and rod if desired and it has been found that practical operation is obtained without the use of any such cushioning means as herein described.

Brake shoe 81, is covered with brake lining 82, which brake shoe is pivotally mounted on shaft 83, which shaft has an eccentric portion 84 extending into a suitable receptacle in lug portion 85 of bracket member 46. Set screws 86 are provided for securing shaft portion 84 against movement within lug portion 85. Adjustment of brake shoe 81 toward and away from friction wheel 33 is obtained by loosening set screws 86 and turning said shaft composed of the two relatively eccentric portions 83 and 84. The angular position of the brake shoe 81 is determined by two positioning bolts 87 connected with the said brake shoe at points above and below the pivot shaft 83. The positioning bolts 87 extend thru fingers 88 of bracket member 46 and have compression springs 89 thereon which are adjustably held by nuts 90. The parts just described control the angular position of the brake shoe and permit smooth operation in the engagement of the brake member and the friction wheel 33. A raised portion 91 is provided on the outer periphery of the friction wheel 33 for engagement by the brake shoe 81. It has been found in operation, that as wear has obtained on the friction wheel 33 that smoother operation of our device is obtained if the brake shoe 81 is adjusted in such a manner that the end portion 81' thereof engages continuously in a small degree. When the brake shoe 81 is adjusted in this manner the rocking movement of the swinging arm which would otherwise obtain is prevented. This rocking movement is due to the weight of the friction wheel 33, and the non-engagement of the brake at those times when the operator removes sufficient pressure so that the friction wheel 33 is not securely engaged by the friction surface 17. This adjustment of the brake shoe 81, permitting a continuous braking effect of a slight degree, has prevented the rocking condition referred to and has been found to be only slightly effective upon the life of the brake lining.

In the operation of our device saw 18 and friction wheel 17 are driven continuously but swinging arm 21 will remain in the retracted position shown in dotted lines in Fig. 3 unless brake pedal 65 is depressed. This retracted position is maintained by reason of the engagement of the raised portion 91 on the periphery of friction wheel 33 with brake shoe 81, which engagement in turn positions the friction roller 17 in an intermediate or neutral position, between friction surfaces 43 and 45. From this position depression of the foot pedal 65 acts thru link 60 on the bracket 46 and moves the driven friction roller 17 into engagement with surface 43 of friction wheel 33, thereby rotating friction wheel 33 in a counter-clockwise direction as shown by arrows in Fig. 3 and thereby producing movement of the swinging arm 21. If the pressure on the foot pedal 65 is released before the friction wheel 33 rotates, substantially more than one-half a revolution from the fully retracted position heretofore mentioned, the friction roller 17 will be drawn by the spring 56 into engagement with the surface 45 of the inner segment 44 and the swinging arm 21 will be returned at an accelerated speed in the direction of a retracted position, and will be stopped and held in this position by the engagement of the raised surface 91 and the brake shoe 81, and consequent movement of friction roll 17 into disengaged position. The accelerated speed of the return movement is attained by reason of the smaller diameter of the surface 45 as compared to the surface 43. It will be noted that segment 44 will always be opposite friction roller 17 until the connecting rod has passed the dead center position, so that engagement between the friction roller 17 and segment 44 is attainable for that portion of the revolution of the friction wheel 33, substantially more than one-half thereof. If the pressure on foot pedal 65 is maintained for substantially more than one-half of one revolution but less than an entire revolution of said wheel from the fully retracted position, previously described, the friction roller 17 will maintain engagement with the outer friction surface 43 until after the segment 44 has passed or cleared the friction roller 17. When the pressure is removed friction roller 17 will be retracted by spring 56 until bracket member 46 engages stop 58, but said roller will not engage segment 44 which segment will then be in a position of its path removed from said friction roller 17 therefore no driving force is provided by friction roll 17 against friction wheel 33. However, as friction wheel 33 has passed the dead center points of the connecting rod 37, there will be sufficient force to return the swinging arm 21 to the fully retracted position, due to the momentum of the friction wheel 33 together with the weight of the swinging arm 21, when the friction wheel 33 will be again held in fully retracted position by the operation of the brake member 81.

If the pressure on the foot pedal 65 is maintained continuously then a continuous engagement is obtained between friction roll 17 and friction surface 43, whereby continuous rotation of friction wheel 33, together with continuous oscillation of swinging arm 21 together with continuous disengagement of brake member 81 is obtained except the slight engagement of the portion 81' of the brake shoe, which may be maintained by the preferable adjustment heretofore discussed.

Obviously, changes may be made in the form, dimensions, and arrangement of the parts of our invention without departing from the principle thereof, the above setting forth only preferred forms of embodiment.

We claim:

1. In a trimmer saw, a swinging saw frame and power operating means connected therewith, said means embodying a friction wheel having an internal friction surface and an external friction surface and driving means selectively operatively disposed as respects said friction surfaces.

2. In a trimmer saw, a swinging saw frame and power operating means connected therewith, said means embodying a friction wheel having two friction surfaces and driving means selectively operatively disposed as respects said friction surfaces.

3. In a trimmer saw, a swinging saw frame and power operating means connected therewith, said means embodying a friction wheel having an internal friction surface and an external friction surface, said friction surfaces being of arcuate shape and one thereof being a segment and driving means selectively operatively disposed as respects said friction wheel.

4. In a trimmer saw, a swinging saw frame and power operating means connected therewith, said means embodying a friction wheel having two arcuate shaped friction surfaces of different radii and driving means selectively operatively disposed as respects said friction surfaces.

5. In a trimmer saw, a swinging saw frame and power operating means connected therewith, said means embodying a friction wheel having an internal friction surface and an external friction surface; a driven friction roller operatively disposed as respects the friction surfaces, and means for selectively operatively engaging said driven friction roller with said friction surfaces.

6. In a trimmer saw, a swinging saw frame and power operating means connected therewith, said means embodying a friction wheel having two arcuate shaped friction surfaces of different radii; a driven friction roller operatively disposed between said friction surfaces and means for selectively operatively engaging said driven friction roller with either of said friction surfaces whereby the rotary speed of said friction wheel is greater in one direction than it is in the other.

7. In a trimmer saw, a swinging saw frame and power operating means connected therewith, said means embodying a friction wheel having an internal friction surface and an external friction surface, a driven friction roller operatively positioned between said friction surfaces and means for selectively operatively engaging said driven friction roller with either of said friction surfaces whereby said friction wheel is selectively rotated in either direction.

8. In a trimmer saw, a swinging saw frame and power operating means connected therewith, said means embodying a friction wheel having an internal friction surface and an external friction surface and a raised portion on the periphery thereof; a driven friction roller operatively disposed as respects the friction surfaces and means for selectively operatively engaging said driven friction roller with said friction surfaces, and a brake member positioned for engagement with said raised portion of said friction wheel.

9. In a trimmer saw, a swinging saw frame and power operating means connected therewith, said means embodying a friction wheel having two arcuate shaped friction surfaces, a driven friction roller operatively disposed as respects said friction surfaces; means for operatively engaging said friction roller with said friction surfaces and means including a crank member connecting said friction wheel and said swinging saw frame for oscillation.

10. In a trimmer saw, a swinging saw frame and power operating means connected therewith, said means embodying a friction wheel having two arcuate shaped friction surfaces; a driven friction roller operatively disposed as respects said friction surfaces; means for operatively engaging said friction roller with said friction surfaces, and adjustable means connecting said friction wheel and said swinging saw frame whereby said swinging saw frame is oscillated and the length of stroke thereof is readily adjusted.

11. In a trimmer saw, a swinging saw frame and power operating means connected therewith, said means embodying a friction wheel having two arcuate shaped friction surfaces a driven friction roller, a swingingly mounted bracket supporting said driven friction roller between said two friction surfaces and selective positioning means connected with said bracket.

12. In a trimmer saw, a swinging saw frame and power operating means connected therewith, said means embodying a friction wheel having two arcuate shaped friction surfaces a driven friction roller, a swingingly mounted bracket supporting said driven friction roller between said two friction surfaces, yielding means urging the bracket in one direction, and lever means adapted to urge the bracket in the other direction.

13. In a trimmer saw, a swinging saw frame and power operating means connected therewith, said means embodying a friction wheel having two arcuate shaped friction surfaces, a raised portion on the periphery of said friction wheel, a driven friction roller, a swingingly mounted bracket supporting said driven friction roller between said two friction surfaces; selective positioning means connected with said bracket and a brake supported by said bracket, adapted for engagement with said raised portion of said friction wheel.

14. In a trimmer saw, a swinging saw frame and power operating means connected therewith, said means embodying a friction wheel having two arcuate shaped friction surfaces; a raised portion on the periphery of said friction wheel, a driven friction roller; a swingingly mounted bracket supporting said driven friction roller between said two friction surfaces; selective positioning means connected with said bracket and a brake supported by said bracket, adapted for engagement with said raised portion of said friction wheel and adapted to be moved in one direction when engaged by said raised portion, and yielding means urging said swinging bracket in the other direction, engaging the driven friction roller with one of said friction surfaces, whereby the driven friction roller is held in inoperative position as respects said friction surfaces when the brake is engaged.

15. In a trimmer saw, a swinging saw frame and power operating means connected therewith; said means embodying a friction wheel having an internal friction surface of larger diameter and an external friction surface of smaller diameter, said friction surfaces being of arcuate shape and the smaller one being a segment, a raised portion on the periphery of said friction wheel, a driven friction roller; a swingingly mounted bracket supporting said driven friction roller between said two friction surfaces, selective positioning means connected with said bracket and a brake supported by said bracket, adapted for engagement with said raised portion of said friction wheel, and adapted to be moved in one direction when engaged by said raised portion, and yielding means urging said swingingly mounted bracket in the other direction engaging the driven friction roller with one of said friction surfaces; a stop limiting the movement of said bracket by the said yielding means.

16. In a trimmer saw, a base frame; a swinging frame mounted for oscillation on said base frame; a circular saw mounted on said swinging frame; a driving motor for said saw carried by said swinging frame; a friction wheel rotatably mounted on said base frame and having two friction surfaces of different diameters; crank means connected with said friction wheel; a connecting rod connecting said crank means with said swinging frame; a driven friction roller operatively disposed between the two friction surfaces of said friction wheel; a bracket member supporting said driven friction roller and pivoted for rocking movement whereby said friction roller may be selectively positioned in engagement with either of said friction surfaces, or in a disengaged position relative to both of said friction surfaces; resilient means urging said bracket member in one direction; a foot pedal connected with said bracket member for moving the same in the opposite direction; a raised portion on the external periphery of said friction wheel; and a brake shoe supported by said bracket member in close proximity to the outer periphery of said friction wheel, said brake shoe being positioned in the path of said raised portion when no pressure is exerted on said foot pedal, whereby said brake shoe may be engaged by said raised portion and the bracket member connected thereto may be moved to thereby disengage the friction roller relative to both of said friction surfaces.

17. In operating means for controlling a power driven swinging saw frame, a swinging saw frame; power means for swinging said frame; lever means for selectively engaging the power means with the swinging saw frame; and indicating means operatively connected between the swinging saw frame and the lever means.

18. In operating means for controlling a power driven swinging saw frame, a swinging saw frame; power means for swinging said frame; lever means normally disengaging the power means from the swinging saw frame member and connecting said power means to said swinging saw frame member when the lever means are depressed; and yielding means connecting the saw frame and the lever means, whereby the extent of movement of the swinging frame is indicated by a gradually increasing pressure upon the said lever means.

In witness whereof, we hereunto subscribe our names this 18th day of May, 1931.

FRED A. NICHOLSON.
WILMOT T. PRITCHARD.